US012775534B2

(12) United States Patent
Govindachar

(10) Patent No.: US 12,775,534 B2
(45) Date of Patent: Oct. 27, 2026

(54) CODIFYING, DISCOVERY AND VALIDATION OF SYSTEM-IN-PACKAGE RESOURCES

(71) Applicant: Mercedes-Benz Group AG, Stuttgart (DE)

(72) Inventor: Suresh Govindachar, Sunnyvale, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/972,583

(22) Filed: Dec. 6, 2024

(65) Prior Publication Data

US 2026/0161518 A1 Jun. 11, 2026

(51) Int. Cl.
*G06F 11/22* (2006.01)

(52) U.S. Cl.
CPC ................................ *G06F 11/2205* (2013.01)

(58) Field of Classification Search
CPC ............. G06F 11/2205; G06F 11/2257; G06F 11/2284; G06F 11/2289; G06F 11/3051; G06F 11/0739
See application file for complete search history.

(56) References Cited

U.S. PATENT DOCUMENTS 8,423,584 B2 * 4/2013 Bavaria ................ G06F 9/4411 707/803
11,386,521 B2 7/2022 Koker
11,831,507 B2 11/2023 Bernat
12,056,789 B2 8/2024 Matam
12,522,228 B2 * 1/2026 Piednoel ............... B60W 50/06
2003/0093510 A1 * 5/2003 Cen ....................... G06F 15/177 709/223
2009/0144594 A1 6/2009 Chakraborty et al.
2013/0139014 A1 * 5/2013 Geukes .......... G01R 31/318572 714/E11.155
2014/0229713 A1 * 8/2014 Muff ..................... G06F 9/3851 712/208
2019/0188002 A1 * 6/2019 Otsuka .................. G06F 3/1204
2021/0173620 A1 * 6/2021 Jiang ......................... G06F 8/20
2022/0243437 A1 * 8/2022 Malipeddi ........... G06F 11/2242
2023/0305993 A1 9/2023 Davis
2024/0193284 A1 * 6/2024 Guim Bernat ........ G06F 21/604
2024/0375670 A1 11/2024 Piednoel
2025/0211238 A1 * 6/2025 Galan ................... H03L 7/0816

OTHER PUBLICATIONS

Cronk, D. et al., "Selectable Power-On Self-Test Modes", IBM Technical Disclosure Bulletin, Aug. 1994, vol. 37, No. 08, pp. 397-400.

(Continued)

*Primary Examiner* — Ashish Thomas
*Assistant Examiner* — Catherine Marie Nguyen
(74) *Attorney, Agent, or Firm* — Mahamedi IP Law LLP

(57) ABSTRACT

A system-in-package can include one or more chiplets, with each chiplet comprising a set of resources and a host node. Upon powerup sequencing of the system-in-package, the host node of each chiplet can read a chiplet description artifact (CDA) identifying the set of resources of the chiplet, and initiate a performance test to verify operability of the set of resources and connectivity between the set of resources as identified in the CDA.

18 Claims, 3 Drawing Sheets

(56) References Cited

OTHER PUBLICATIONS

Chen, C.-Z. et al., "An FPGA-Based Verification Platform for High-Speed Interface IPs", China Semiconductor Technology International Conference (CSTIC), IEEE, Jun. 20, 2022, pp. 1-3.

International Search Report and Written Opinion of the International Searching Authority for the Application No. PCT/EP2025/085614 mailed Feb. 26, 2026.

* cited by examiner

CODIFYING, DISCOVERY AND VALIDATION OF SYSTEM-IN-PACKAGE RESOURCES

BACKGROUND

A system-in-package (SIP) can comprise a number of chiplets packaged as a chip and included on a printed circuit board (PCB); when there is only one chiplet, it would be a system on chip (SOC). During bootup or powerup sequencing, the components of the SIP must be verified.

SUMMARY

Described herein is a system-in-package (SIP) that can be included on a printed circuit board (PCB). In various examples, the SIP can include a single chiplet, such as a system-on-chip (SoC), or a plurality of chiplets. The chiplets may be comprised of various nodes that relate to the use of the chiplets, such as input-output (IO) nodes, various types of memory (e.g., FIFOs, static and dynamic RAMs, SSDs, etc.), and processing circuits (e.g., in-line circuitry, CPUs, DSPs, GPUs, FPGAs, etc.). During powerup sequencing of the SIP, a basic input-output system (BIOS) initializes and configures the hardware components of the SIP, and must verify the components of the SIP and whether the connectivity between the components are operable. The SIP must also verify whether the nodes needed to execute the runnables of a program or application to be launched in the SIP are indeed present in the SIP.

Further described herein is a system, method, and non-transitory computer readable medium for codifying the various attributes of SIPs, discovering and validating the SIP attributes, and validating the presence of the resources required for each runnable to be executed in the SIP. In implementation, an SIP Description Artifact (SDA) is provided herein that comprises a hierarchically organized object configured for discovery and verification of the attributes of the SIP. The SDA can include a top level identifier comprising a read-only identifier embedded in the SIP or stored in read-only-memory (ROM). Every element within the SIP can be memory-mapped such that the SDA's specification includes a set of address ranges, which can comprise a start and end range or a starting value and capacity. The specification of address ranges can comprise a combination of absolute and relative values. For example, the starting address for the SIP can be specified as an absolute value or as a placeholder (e.g., to be determined at startup), whereas the starting address for an element of the SIP may be specified as an absolute value or as an offset from a reference address such as the starting address for the SIP. In certain implementations, specifications for the elements of the SIP can include the safety integrity level (e.g., an ASIL rating) associated with the element.

As provided herein, the elements of the SIP can include individual chiplets, each of which can be characterized by a Chiplet Description Artifact (CDA). The CDA of a particular chiplet of the SIP can describe the chiplet's nodes (e.g., compute nodes with or without associated memory, memory nodes, input-output (IO) nodes, etc.) and the connectivity between the nodes. In various examples, compute nodes may be identified by type (e.g., CPU, GPU, DSP, accelerator type, FPGA, etc.) with its associated memory (if any). In further examples, the computational capability of each compute node as well as connection information of the computing node on a network-on-chip (NOC) can be specified in the CDA of the chiplet. This information can include the memory specification of the compute node, type (e.g., cache, vector memory, SRAM, etc.), bandwidth, latency, hardware attributes, protocol, and the like. Likewise, specifications for the memory nodes and IO nodes of the chiplet can include address range, type and/or hardware attributes, bandwidth, latency, interface type to the NOC, and the like.

For each chiplet, a host node can be specified (e.g., a CPU/DSP node with relatively high safety integrity level), which can be included on a separate NOC with a similarly high safety integrity level (e.g., ASIL-D), and can communicate with other host nodes using a high-reliability network (e.g., a functional safety (FuSa) network). Likewise, each SIP can include a host chiplet that manages the SIP through communications with the host nodes of the other chiplets. Alternatively, the host node for the SIP and/or one or more of the chiplets can be included off-package. As provided herein, the SDA of the SIP and CDA of each chiplet can specify which chiplet comprises the host chiplet and which node comprises the host node respectively.

In certain aspects, during powerup sequencing or bootup, the host node of a host chiplet can read the SDA of the SIP and control power up of each of the chiplets of the SIP. In these aspects, the host node of the host chiplet can obtain the CDA and status information (e.g., hardware health information and node verification) of each chiplet in the SIP (e.g., via commands and requests to each chiplet). In variations, during powerup sequencing, the host node of each chiplet can individually power up the chiplet, read the CDA of the chiplet, initiate a performance test on the chiplet, verify the components or nodes of the chiplet, verify the connectivity of the chiplet, and report the CDA and condition of the chiplet to the host chiplet. A host node of the host chiplet may then confirm the—CDAs and connectivity of each chiplet in the SIP. Prior to executing program code comprising a set of runnables, the host chiplet can read an application description artifact (ADA) of the application, which can comprise a specification of each runnable. This specification for each runnable in the ADA can indicate the resources needed to launch the runnable. The host chiplet can confirm that the SIP, or specified nodes of one or more chiplets of the SIP, includes the resources necessary for launching the runnable as indicated in the ADA. As described herein, the ADA can indicate the maximum needed resources required for launching each of the runnables of the application. In some examples, the host chiplet can verify that the SIP has the resources required for launching the runnable, and launch the runnable on the appropriate resources of the SIP accordingly.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
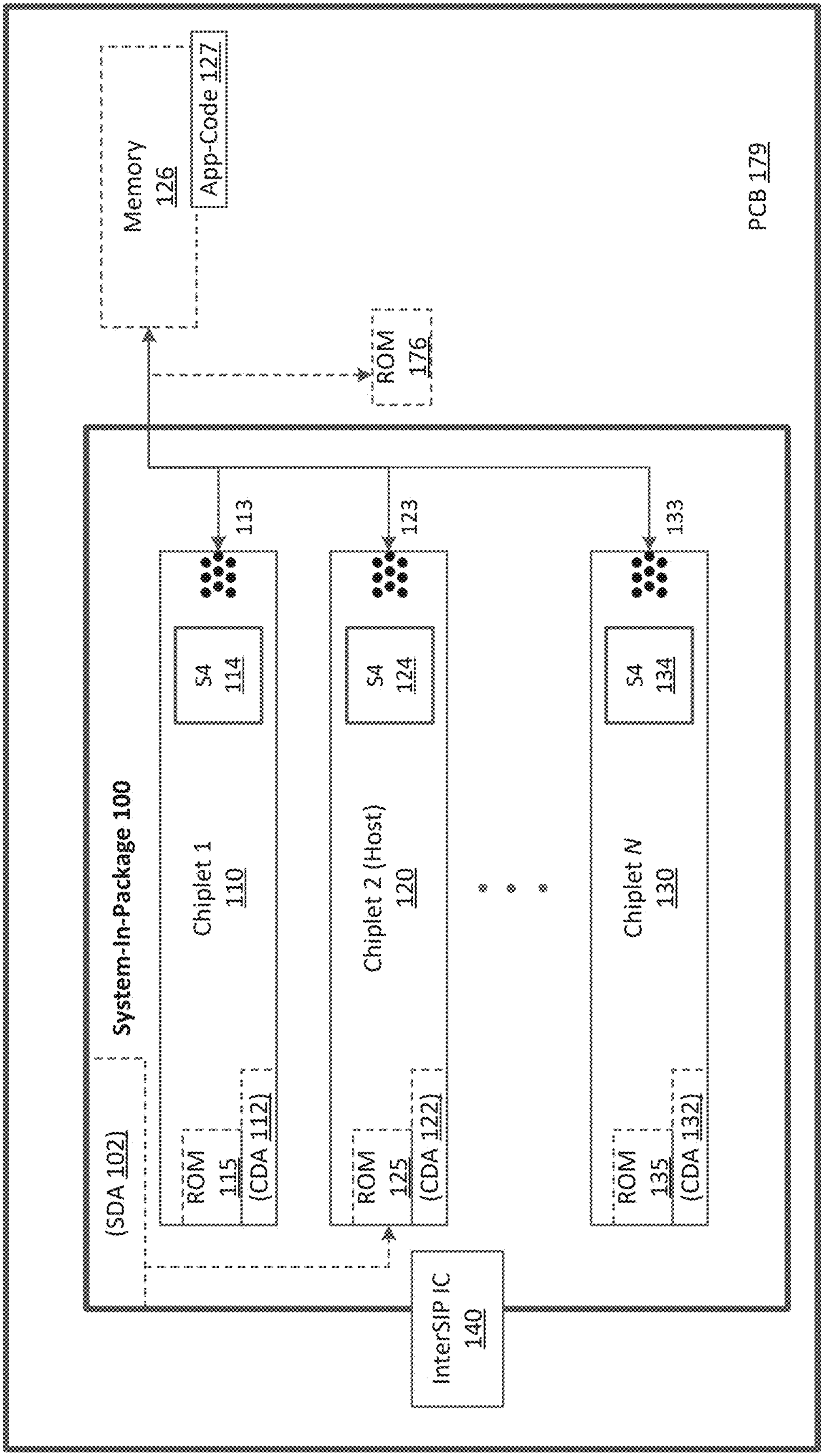
FIG. 1 is a block diagram depicting a system-in-package in which resources are codified for discovery and validation, according to examples described herein.

The chiplets of a system-in-package (SIP) are designed to be highly modular and scalable, allowing for the creation of complex systems from smaller, simpler components or nodes that are typically designed to perform specific functions or tasks, such as memory, graphics processing, or input/output (I/O) functions. These nodes may be interconnected with each other and with a main processor or controller using high-speed interfaces, forming a chiplet. Chiplets offer increased modularity, scalability, and manufacturing efficiency compared to traditional and current monolithic chip designs, as well as the ability to be tested individually before being combined into the larger system.

In various examples, the SIP may also include one or more inter-SIP interconnects for connecting multiple SIPs together. For single or multiple SIP arrangements, each SIP may be associated with a unique SDA and each chiplet of each SIP can be associated with a unique CDA. The host node of each chiplet can read its CDA (e.g., in ROM) while a host node of a host chiplet can read the SDA of the SIP (e.g., also in ROM). In accordance with examples provided herein, when the SIP is powered up, each host node of each chiplet can execute a performance test to discover and/or identify the chiplet's nodes and connectivity information for the chiplet. Each chiplet may then report the performance test and CDA to the host chiplet, which can use each report to discover and validate the resources and connectivity of the entire SIP package. The host chiplet may then read the ADA of an application, which can specify the resources required to launch each runnable of the application and verify that the SIP has the required resources requires. In further examples, a scheduler on the host chiplet can allocate each runnable to specific resources of the SIP that are available and have the capability to launch the runnable.

In accordance with examples described herein, a computer hardware topology (e.g., comprising a set of chiplets arranged on an SIP) can be tasked with launching an application comprising a set of runnables for any purpose. For example, workloads programmed in an application can be executed as runnables to perform data processing tasks (e.g., sensor data processing for autonomous driving). For sensor data processing, such as general perception, scene understanding, object detection and classification, ML inference, motion prediction and planning, and/or autonomous vehicle control tasks, the SIP can include various chiplets that perform, for example, machine-learning inference tasks, sensor fusion tasks, and command generation tasks for vehicle control. In various aspects, the SIP arrangement can comprise multiple chiplets for performing sensor data processing tasks (e.g., for autonomous driving). Accordingly, the hardware topology can comprise a central chiplet of the SIP, one or more sensor data input chiplets, any number of workload processing chiplets, ML accelerator chiplets, general compute chiplets, autonomous drive chiplets, high-bandwidth memory chiplets, and interconnects between the chiplets.

In certain examples, the sensor data input chiplet obtains sensor data from the vehicle sensor system, which can include any combination of cameras, LIDAR sensors, radar sensors, ultrasonic sensors, proximity sensors, and the like. The central chiplet can comprise the shared memory and reservation table where information corresponding to workloads (e.g., workload entries) are inputted. In further examples, the set of workload processing chiplets can execute workloads as runnables using dynamic scheduling and the reservation table implemented in the shared memory of each SIP.

Upon obtaining each item of sensor data (e.g., individual images, point clouds, radar pulses, etc.), the sensor data input chiplet can indicate availability of the sensor data in the reservation table, store the sensor data in a cache, and indicate the address of the sensor data in the cache. Through execution of workloads in accordance with a set of independent pipelines, a set of workload processing chiplets can monitor the reservation table for available workloads. As provided herein, the initial raw sensor data can be referenced in the reservation table and processed through execution by an initial set of workloads by the workload processing chiplets. As an example, this initial processing can comprise stitching images to create a 360-degree sensor view of the vehicle's surrounding environment, which can enable the chiplets to perform additional workloads on the sensor view (e.g., object detection and classification tasks).

One or more embodiments described herein may be implemented on a computing system. Examples computing systems can include one or more control circuits that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), systems on chip (SoCs), systems-in-package (SIPs), or any other control circuit. In some implementations, the control circuit(s) and/or computing system may be part of, or may form, a vehicle control unit (also referred to as a vehicle controller) that is embedded or otherwise disposed in a vehicle (e.g., a Mercedes-Benz® car, truck, or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, an autonomous vehicle control system, or any other controller (the term "or" is used herein interchangeably with "and/or").

In an embodiment, the control circuit(s) and other processing units may be programmed by one or more computer-readable or computer-executable instructions stored on the non-transitory computer-readable medium. The non-transitory computer-readable medium may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, for example, a computer diskette, a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), and/or a memory stick. In some cases, the non-transitory computer-readable medium may store computer-executable instructions or computer-readable instructions.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit to perform one or more functional tasks. The modules and computer-readable/executable instructions may be described as performing various operations or tasks when the control circuit(s) or other hardware components execute the modules or computer-readable instructions.

In further embodiments, the computing system can include a communication interface that enables communications over one or more networks to transmit and receive data. In certain embodiments, the communication interface may be used to communicate with one or more other computing systems. The communication interface may include any circuits, components, software, etc. for communicating via one or more networks (e.g., a local area network, wide area network, the Internet, secure network, cellular network, mesh network, and/or peer-to-peer communication link). In some implementations, the communication interface may include for example, one or more of a communications controller, receiver, transceiver, transmitter, port, conductors, software and/or hardware for communicating data/information.

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc. As further provided herein, a functional safety (FuSa) network, safe and secure sub-system (S4) network, or high reliability network can comprise a communication network-on-chip within a SIP that comprises nodes and components having a high safety level (e.g., ASIL-D). An "application network-on-chip" or "app-NOC network" of the SIP comprises connections between nodes of each chiplet, and involves the transmission of application data between chiplets, typically, through the UCIe connection with the host chiplet.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as flash memory or magnetic memory. Computers, terminals, network-enabled devices are all examples of machines and devices that utilize processors, memory, and instructions stored on computer-readable mediums. Additionally, examples may be implemented in the form of computer programs, or a computer usable carrier medium capable of carrying such a program.

Example System-In-Package

Referring to FIG. 1, a system-in-package (SIP) 100 is associated with an SIP Description Artifact (SDA) 102 and can include any number of chiplets. In the example shown in FIG. 1, the SIP 100 includes chiplet 1 110, chiplet 2 120, and any number of additional chiplets (up to chiplet N 130). Each chiplet can be associated with a chiplet description artifact (CDA 112, 122, 132) respectively. According to certain examples, the top level of the SDA 102 can comprise an identifier for the SIP 100, with the remainder of the SDA 102 comprising a collection of CDAs, as described above, and connectivity information for the SIP 100. The SIP 100—in which the chiplets 110, 120, 130 are disposed, and where the chiplets 110, 120, 130 can be connected to each other via specified connection ports 113, 123, 133 of the chiplets (e.g., via interconnects)—can be disposed on a printed circuit board (PCB) 179. As provided herein, the SDA 102 can include this connectivity information, identifying which specific ports 113, 123, 133 of each chiplet are used to connect with specified ports of other chiplets. In alternate realizations, a PCB may contain multiple SIPs connected to each other via inter-SIP interconnects 140. As provided herein, the ports 113, 123, 133 between the chiplets 110, 120, 130 can comprise UCIe interconnects, whereas the chiplets 110, 120, 130 may interact with components of the PCB 179 via alternative interconnects, such as a peripheral component interconnect express (PCIe), serial peripheral interface (SPI), JTAG interface, USB, and the like.

In various implementations, when the SIP 100 is booted, each host node of each chiplet can read or access the chiplet's CDA, 112, 122, 132, which can be stored in read-only memory (ROM, e.g., ROM 115, 125, 135), embedded on the PCB 179 substrate and read directly, embedded or stored on each chiplet 110, 120, 130, embedded or stored on the SIP's host chiplet 120, and the like. In one example, multiple methods may be implemented, such as a combination of ROM storage and substrate embedding. In such embodiments, host nodes of individual chiplets 110, 120, 130 may attempt to read the respective CDA 112, 122, 132 from either the substrate or a ROM 115, 125, 135 on each chiplet 110, 120, 130, providing some redundancy, and once the host nodes of each chiplet 110, 120, 130, reads their respective CDA 112, 122, 132, the host nodes may initiate a performance test on the chiplet to verify that the chiplet is functioning according to its CDA 112, 122, 132.

In certain examples, part of the boot process can result in the determination of whether the chiplet 110, 120, 130 is within its own package or is part of a SIP 100. Each host node may then report the condition of its chiplet 110, 120, 130 (e.g., whether nodes and connectivity are functioning nominally) and its CDA 112, 122, 132 to the host chiplet 120 of the SIP 100. It is contemplated that the CDA 112, 122, 132 of each chiplet may be stored on a ROM 115, 125, 135 in the respective chiplet 110, 120, 130. It is further contemplated that a ROM 125 of the SIP's host chiplet 120 may store the SDA 102 of the SIP 100 (e.g., as defined by the dashed line between the SDA 102 and the ROM 125). In certain examples, each ROM can comprise an electrically erasable programmable read-only memory (EEPROM), which can be included on a particular component or node of each chiplet 110, 120, 130, such as on a microcontroller, circuit board (e.g., with firmware), embedded on substrate, etc. Additionally or alternatively, the EEPROM may be integrated on chip, external to the chiplet or connected to a microcontroller on another device via a serial or parallel interface, or can be located as part of a system-on-module (e.g., integrated with other components, such as microcontroller, memory peripherals, etc.).

In certain examples, the host chiplet 120 may access the SDA 102 and its own CDA 122 from a ROM 125 on the host chiplet 120 or otherwise read the SDA 102 and CDA 122 if they are embedded on the PCB 179 or substrate of the host chiplet 120. Alternatively, the CDA 112, 122, 132 of each chiplet 110, 120, 130 and the SDA 102 can be on an optional ROM 176 on the PCB 179, with the host nodes of each chiplet 110, 120, 130, having access to the ROM 176. In such an implementation, each host node of each chiplet 110, 120, 130 could be programmed to identify a specific address in the ROM 176 to read from, and how much to read (e.g., a specific address range) to obtain their respective CDAs 112, 122, 132 and the SDA 102. In a further variation, the CDAs 112, 122, 132 and SDA 102 may be stored or embedded in any combination of the foregoing, such as among the ROM 125 on the host chiplet 120, the ROM 176 of the PCB 176, or any of the ROMs 115, 125, 135 of the chiplets 110, 120, 130.

In certain implementations, when implementing the performance test, the host chiplet 120 can infer or otherwise verify the operability of the connections 113, 123, 133 between the chiplets 110, 120, 130 (e.g., by performing a connectivity test). The host chiplet 120 can further read or access the SDA 102 of the SIP 100, and can confirm each CDA 112, 122, 132 reported by each host node of the chiplets 110, 120, 130, and can further confirm that the connectivity of the SIP 100 is functioning per the SDA 102. In certain examples, especially in safety critical deployments, each chiplet 110, 120, 130 can include a safe and secure subsystem (e.g., represented by S4 114, 124, 134, each having a high safety rating, e.g., ASIL-D) comprising a high-reliability network (e.g., a functional safety and/or health monitoring network) between the chiplets 110, 120, 130. Hosts of such chiplets, including of the associated host chiplet, can be included as part of the safe and secure subsystems (S4s). As provided herein, the S4 components 114, 124, 134 shown in each chiplet 110, 120, 130 can comprise node resources having a high safety rating, and can include transient resistant cores, memory component, interfaces, and the like. In the examples described herein, the performance reports and CDAs 112, 122, 132 for each chiplet 110, 120, 130 may be communicated to the host chiplet 120 over the safe and secure subsystem S4 114, 124, 134.

In further examples, application program code 127 may be stored in memory 126, which can be included on-package or, typically, external to the SIP 100. The program code 127 can be comprised of a set of runnables, with each runnable being associated with meta information such as resources needed for executing the runnable (e.g., computational capability, memory requirements, etc.), and anticipated duration for executing the runnable. In alternate implementations, the duration may be specified as a number, or as one or more equations that a specified node of a particular chiplet 110, 120, 130—which is responsible for launching and monitoring the runnable-would use to determine the duration of the runnable based on, for example, a current input workload on the chiplet 110, 120, 130, or specified node of the chiplet 110, 120, 130. It is contemplated that the input data that the runnable would operate upon may change each time the runnable is launched, and therefore the duration may be recalculated based on the change to the input data.

According to examples described herein, each runnable in the program code 127 can include a specification mirroring the specifications in the SDA 102 and CDAs 112, 122, 132 that indicates the resources required for launching the runnable and the duration for launching the runnable on the resources. Prior to executing the program code 127, the host chiplet 120 can read the ADA of the application, which can include a specification of each runnable. The specification of each runnable can identify the maximum resources needed to launch the runnable. The host chiplet 120 can read the ADA and confirm that the SIP 100, or specified nodes of one or more chiplets of the SIP 100, includes the resources necessary for launching the runnable (e.g., for a first time during initialization). If the resources (e.g., a number of DSPs) needed by some runnable is dependent on the input workload, the host node can confirm the availability of resources prior to every launch of the runnable per the ADA. Once a runnable has been launched on the respective resources, a scheduler or safety resource of the host chiplet can monitor that the resources completed execution within the duration allocated for the runnable.

As provided herein, the SDA, CDA, and ADA can comprise any structure, class, or form for identifying the nodes of chiplets and their respective connectivity information, and can be coded in binary, C structure, C++ structure, JAVA, YAML, or any other program language and/or configuration file. For example, these description artifacts can be stored in single write memory, ROM, EEPROM, flash memory, or may be otherwise embedded on the SIP and/or chiplet substrate. Various types of config files are contemplated, such as INI files, YAML files, JSON files, binary formats, and the like. It is further contemplated that a graphical tool may be used (e.g., by an administrator or programmer) to read, write, and/or verify consistency between the description artifacts and their relationship to the resources of the SIP and necessary resources of the runnables of the developed application. For example, when a programmer develops the runnables of an application to be launched on an SIP, a graphical tool may be used to verify that the program code aligns with the capabilities and scheduling of the various resources SIP. In this sense, in certain examples, the ADA of the developed application can be automatically or partially automatically generated using the graphical tool. Likewise, graphical and/or command line tools can be used for automated or partially automated definitions of CDAs and SDAs also. Furthermore, such tools can ensure internal consistency such as absence of island-nodes (nodes or subset of nodes that are not connected to anything other than within themselves), contradictory specifications (e.g., width of a bus is not consistent with the clock and bandwidth of the bus) etc.

Figure 2:
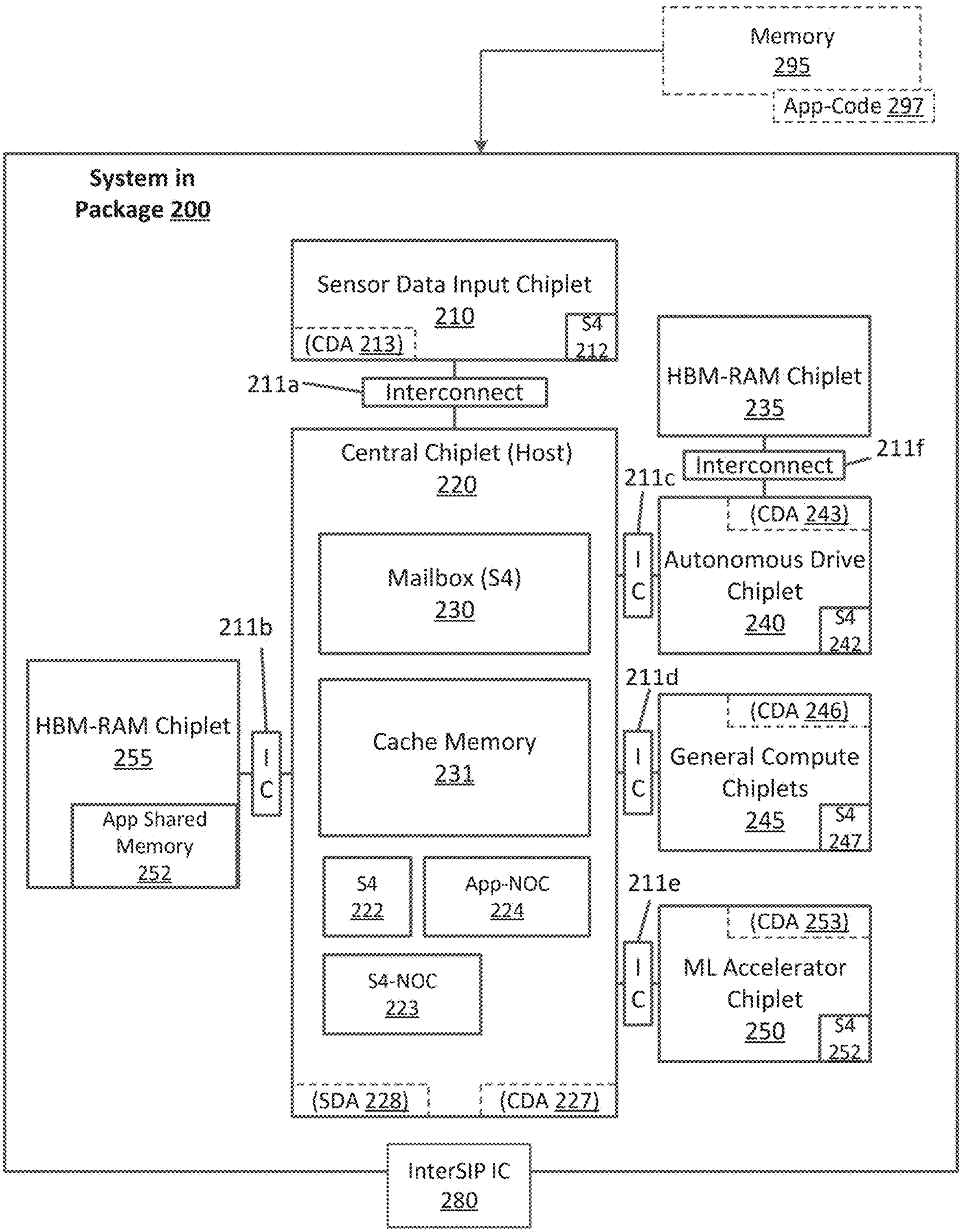
FIG. 2 is a block diagram illustrating an example system-in-package comprising multiple chiplets, in accordance with examples described herein.

FIG. 2 is a block diagram illustrating an example system-in-package (SIP) 200 comprising multiple chiplets implementing powerup sequencing resource discovery and verification, in accordance with examples described herein. In certain implementations, the SIP 100 described with respect to FIG. 1 can be implemented as the SIP 200 shown in FIG. 2, which can comprise various chiplets, such as a sensor data input chiplet 210, a central chiplet 220 comprising a mailbox 230, one or more high-bandwidth memory (HBM) chiplets 235, 255, one or more general compute chiplets 245, a machine-learning accelerator chiplet 250, and an autonomous drive chiplet 240.

The example SIP 200 shown in FIG. 2 can include additional components, and the components of the system-in-package 200 may be arranged in various alternative configurations other than the example shown. Thus, the system-in-package 200 of FIG. 2 is described herein as an example arrangement for illustrative purposes and is not intended to limit the scope of the present disclosure in any manner.

Referring to FIG. 2, the SIP 200 can include any number and type of chiplets. In the example shown in FIG. 2, the SIP 200 includes a sensor data input chiplet 210 having CDA 213, which may be stored in a ROM or embedded in the substrate. The SIP 200 can also include a central chiplet 220 having CDA 227, HBM-RAM chiplet 235, autonomous drive chiplet 240 having CDA 243, general compute chiplet (s) 245 having CDA 246, ML accelerator chiplet 250 having CDA 253, and HBM-RAM chiplet 255. In the example shown in FIG. 2, the central chiplet 220 can also function as the host chiplet of the SIP 200, and therefore the host node (e.g., included in S4 222) of this host chiplet can access or read the SDA 228 of the SIP 200. While the central chiplet 220 is shown as the host chiplet, other chiplets of the SIP 200 may function as the host chiplet. As provided herein, each chiplet of the SIP 200 can further include a host node that communicates with the host node of the host chiplet (e.g., via the high-reliability network represented by the S4 components, described below).

As further provided herein, during powerup sequencing, the host node of each chiplet of the SIP 200 can initiate a performance test of the chiplet's components and connectivity, verify that the components and connectivity match the information provided in the respective CDA of the chiplet, and transmit a performance report and CDA to the host node of the host chiplet. The host node of the host chiplet (e.g., a specified CPU of the central chiplet 220) may then confirm and validate the CDAs and connectivity of each chiplet in the SIP 200, execute application code 297 comprising a set of runnables (e.g., stored on the host chiplet or accessed by the host chiplet via an external memory 295 to the SIP 200). In various examples, the host chiplet may then determine or otherwise read the ADA of the application code 297, which can include the specification for each runnable in the application code 297, and verify the resources required for launching the runnable in the SIP 200 or a specified chiplet of the SIP 200. In an embodiment, when the resources have been verified for a given runnable, the SIP 200 can launch the runnable on the appropriate resources of the SIP 200 accordingly.

In an example of FIG. 2, the central chiplet 220 can comprise the host chiplet, and the host node of this host chiplet can be included in S4 222, which can comprise a central processing unit or digital signal processor (DSP) having a high safety level. In some aspects, the host nodes of the sensor data input chiplet 210, the autonomous drive chiplet 240, the general computer chiplet(s) 245, and the machine-learning accelerator chiplet 250 would also be included in their respective S4's 212, 242, 247, and 252 respectively. These S4 resources can comprise a safe and secure sub-system, which in various examples, would consist of four pairs of DSPs (8 total) with each pair having a high safety rating (e.g., ASIL-D). As provided herein, of each DSP pair, a first DSP pair can be the host node, a second DSP pair can comprise a scheduler node, a third pair can comprise a safety/recovery node, and a fourth DSP pair can comprise a security node. In variations, the S4 resources may be used as symmetric multi-processors with four broad categories of functionalities (e.g., hosting, scheduling, safety/recovery, and security).

In various examples, once the SIP 200 has performed its discovery and validation of resources using the SDA 228 and CDAs of the various chiplets and the ADA of the application, the SIP 200 can launch the application (i.e., schedule and launch) runnables on specified resources based on the requirements of each runnable (e.g., as indicated in the application code 297). In certain implementations, the sensor data input chiplet 210 of the SIP 200 can be used for tasks with runnables that correspond to obtaining sensor data from various sensors. These sensors can include any combination of image sensors (e.g., single cameras, binocular cameras, fisheye lens cameras, etc.), LIDAR sensors, radar sensors, ultrasonic sensors, proximity sensors, and the like. The sensor data input chiplet 210 can automatically dump the received sensor data as it is received into a cache memory 231 of the central chiplet 220. The sensor data input chiplet 210 can also include an image signal processor (ISP) responsible for capturing, processing, and enhancing images taken from the various sensors. The ISP takes the raw image data and performs a series of complex image processing operations, such as color, contrast, and brightness correction, noise reduction, and image enhancement, to create a higher-quality image that is ready for further processing or analysis by the other chiplets of the SIP 200. The ISP may also include features such as auto-focus, image stabilization, and advanced scene recognition to further enhance the quality of the captured images. The ISP can then store the higher-quality images in the cache memory 231.

In some aspects, the sensor data input chiplet 210 can further be tasked with launching runnables for publishing identifying information for each item of sensor data (e.g., images, point cloud maps, etc.) to a mailbox 230 of a central chiplet 220, which acts as a central mailbox for synchronizing runnables for the various chiplets (e.g., runnables included in application code 297 accessed by the central chiplet 220 through memory 295 (e.g., external to the SIP 200 or location within the SIP 200). The identifying information can include details such as an address in the HBM memory 255 which is likely to be cached in cache memory 231 where the data is stored, the type of sensor data, which sensor captured the data, and a timestamp of when the data was captured.

To communicate with the central chiplet 220, the sensor data input chiplet 210 transmits sensor data through an interconnect 211*a* and App-NOC 224, and transmits status and control related data through S4 components S4-NOC, 212, 222, 223, 224 representing the high-reliability nodes/sub-system of the SIP as a whole. Interconnects 211*a-f* each represent die-to-die (D2D) interfaces between the chiplets of the SIP 200. In some aspects, the interconnects include a high-bandwidth data path used for general data purposes to the cache memory 231 and a high-reliability data path to transmit functional safety and scheduler information to the mailbox 230. As provided herein, the high-reliability data paths that facilitate the functional safety (FuSa) and health monitoring communications comprise a high safety level (e.g., ASIL-D), which is represented in FIG. 2 by S4 212 of the sensor data input chiplet 210, S4 222 of the central chiplet 222, S4-network-on-chip (NOC) 223 of the central chiplet 220, S4 242 of the autonomous drive chiplet 240, S4 247 of the general compute chiplet(s) 245, and S4 252 of the ML accelerator chiplet 250. In still further implementations, the SIP 200 can include an inter-SIP interconnect 280 that connects the SIP 200 with other SIPs included on the same PCB.

Depending on bandwidth requirements, an interconnect may include more than one die-to-die interface. For example, interconnect 211*a* can include two interfaces to support higher bandwidth communications between the sensor data input chiplet 210 and the central chiplet 220. In one aspect, the interconnects 211*b-f* implement a memory controller interface and the interconnects 211*a,c-e* implement the Universal Chiplet Interconnect Express (UCIe) standard and communicate through an indirect mode to allow each of the chiplet host processors to access remote memory as if it were local memory. This is achieved by using a specialized Network on Chip (NoC) Network Interface Unit (NIU) (allows freedom of interferences between devices connected to the network) that provides hardware-level support for remote direct memory access (RDMA) operations. In UCIe indirect mode, the host processor sends requests to the NIU, which then accesses the remote memory and returns the data to the host processor. This approach allows for efficient and low-latency access to remote memory, which can be particularly useful in distributed computing and data-intensive applications. Additionally, UCIe indirect mode provides a high degree of flexibility, as it can be used with a wide range of different network topologies and protocols.

In various examples, the SIP 200 can include additional chiplets that can store, alter, or otherwise process the sensor data cached by the sensor data input chiplet 210. The SIP 200 can include an autonomous drive chiplet 240 that can perform the perception, sensor fusion, trajectory prediction, and/or other autonomous driving algorithms of the autonomous vehicle. The autonomous drive chiplet 240 can be connected to a dedicated HBM-RAM chiplet 235 in which the autonomous drive chiplet 240 can publish all status information, variables, statistical information, and/or processed sensor data as processed by the autonomous drive chiplet 240. As provided herein, the autonomous drive chiplet 140 can therefore implement the sensor fusion and facilitate verification of inference-based commands outputted by the machine-learning and/or artificial intelligence aspects of the SIP 200.

In various examples, the SIP 200 can further include a machine-learning (ML) accelerator chiplet 240 that is specialized for accelerating AI workloads, such as image inferences or other sensor inferences using machine learning, in order to achieve high performance and low power consumption for these workloads. The ML accelerator chiplet 240 can include an engine designed to efficiently process graph-based data structures, which are commonly used in AI workloads, and a highly parallel processor, allowing for efficient processing of large volumes of data. The ML accelerator chiplet 240 can also include specialized hardware accelerators for common AI operations such as matrix multiplication and convolution as well as a memory hierarchy designed to optimize memory access for AI workloads, which often have complex memory access patterns.

The general compute chiplets 245 can provide general purpose computing for the system-on-chip 200. For example, the general compute chiplets 345 can comprise high-powered central processing units and/or graphical processing units that can support the computing tasks of the central chiplet 220, autonomous drive chiplet 240, and/or the ML accelerator chiplet 250.

In various implementations, the mailbox 230 can store programs and instructions (e.g., application program code 297) for performing autonomous driving tasks. The mailbox 230 of the central chiplet 220 can further include a reservation table that provides the various chiplets with the information needed (e.g., sensor data items and their locations in memory) for performing their individual tasks. The central chiplet 220 also includes the large cache memory 231, which supports invalidate and flush operations for stored data.

Cache miss and evictions from the cache memory 231 are sent by a high-bandwidth memory (HBM) RAM chiplet 255, which can include a, application-shared memory 252, connected to the central chiplet 220. The HBM-RAM chiplet 255 can include status information, variables, statistical information, and/or sensor data for all other chiplets, and may be accessed by multiple chiplets of the SIP 200.

As provided herein, the mailbox 230 can comprise a mailbox architecture in which a reflex program comprising a suite of instructions is used to execute workloads by the central chiplet 220, general compute chiplets 245, and/or autonomous drive chiplet 240. In certain examples, the central chiplet 220 can further execute a functional safety (FuSa) program using the high-reliability network (e.g., represented by S4 212, S4 242, S4 247, S4 252, S4 222, and S4-NOC 223) that operates to compare and verify output of respective pipelines to ensure consistency in, for example, ML inference operations. In further examples, the central chiplet 220 can communicate with the other chiplets using the high-reliability network to receive their CDAs and performance test reports, confirm and/or validate the resources of the other chiplets using the SDA 228, and allocate runnables to specified chiplets.

Methodology

Figure 3:
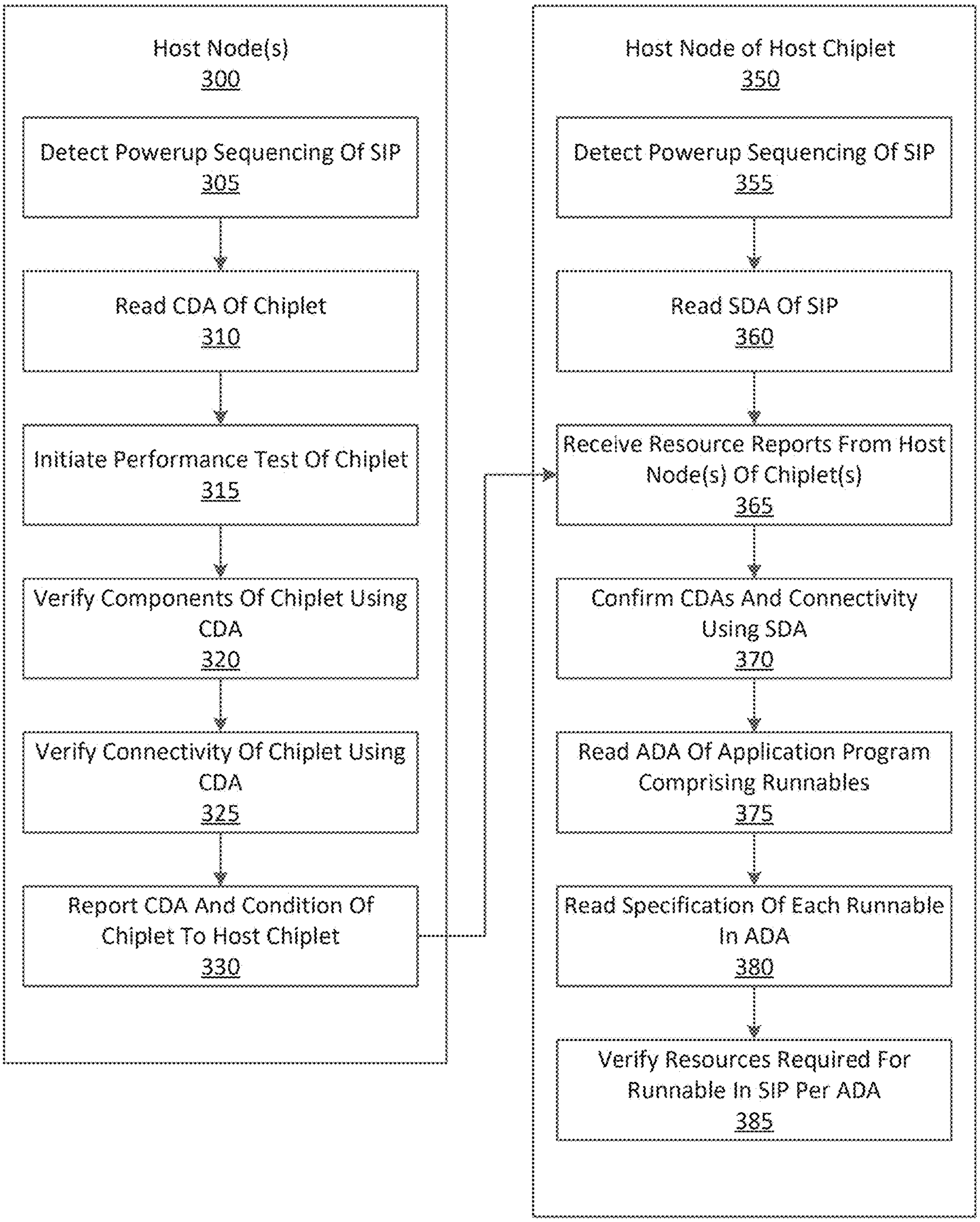
FIG. 3 is a flow diagram describing a method of discovery and validation of a codified system-in-package resources, according to examples described herein.

FIG. 3 is a flow diagram describing a method of discovery and validation of a codified system-in-package resources, according to examples described herein. In the below description of FIG. 3, reference may be made to reference characters representing like features as shown and described with respect to FIGS. 1 and 2. Furthermore, the processes described in connection with FIG. 3 may be performed by a host node of a host chiplet 350 of a SIP 100 and the host node(s) 300 of each chiplet of the SIP 100. Still further, any step described in connection with FIG. 3 may be omitted or may be performed prior to, in conjunction with, or subsequent to any other step where suitable. Referring to FIG. 3, in various examples, the host node of the host chiplet of the SIP 100 can detect powerup sequencing of the SIP 100, at block 355.

In various examples, the host node of the host chiplet 350 can read the SDA 102 of the SIP 100, at block 360. As provided herein, the SDA 102 can include a top level identifier comprising a read-only identifier embedded in the SIP 100 or stored in ROM. In certain implementations, every element within the SIP 100 can be memory-mapped such that the specification of the SDA 102 includes a set of address ranges comprising a start and end range or a starting value and capacity. The specification of address ranges can comprise a combination of absolute and relative values. For example, the starting address for the SIP 100 can be specified as an absolute value or as a placeholder, whereas the starting address for an element of the SIP 100 may be specified as an absolute value or as an offset from a reference address such as the starting address for the SIP 100. In certain implementations, specifications for the elements of the SIP 100 can include the safety integrity level (e.g., an ASIL rating) associated with the element. Furthermore, the SDA 102 can identify connectivity information to the SIP 100 as a whole, such as the types, specifications, and locations of connections between components of the SIP 100.

In various implementations, the host node 300 (e.g., a specified DSP or CPU having a high safety rating) of each chiplet 110, 120, 130 can also detect powerup sequencing of the SIP 100, at block 305. At block 310, the host node 300 of each chiplet may then read the CDA 112, 122, 132 of its respective chiplet 110, 120, 130, either via read-only identifier embedded in the substrate or stored in ROM 115, 125, 135 on each chiplet 110, 120, 130. In certain examples, the host nodes 300 can be instructed by the host node of the host chiplet 350 to read their respective CDAs 112, 122, 132, or may do so independently upon detecting powerup sequencing. In further examples, the host node of the host chiplet 350 may further read the CDA of the chiplet on which it is disposed, and therefore can also be treated generally as a host node 300, and perform the functions of a host node 300.

As provided herein, the CDA 112, 122, 132 of each chiplet 110, 120, 130 comprises a hierarchically organized object configured for discovery and verification of the attributes of the chiplet 110, 120, 130. The CDA of a particular chiplet of the SIP 100 can describe the chiplet's nodes (e.g., compute nodes with or without associated memory, memory nodes, input-output (IO) nodes, etc.) and the connectivity between the nodes. As further provided herein, compute nodes may be identified by type (e.g., CPU, GPU, DSP, accelerator type, FPGA, etc.) with its associated memory (if any). The computational capability of each compute node as well as connection information of the computing node on a network-on-chip (NOC) can be specified in the CDA of the chiplet. This information can include the memory specification of the compute node, type (e.g., cache, vector memory, SRAM, etc.), bandwidth, latency, hardware attributes, protocol, and the like. Likewise, specifications for the memory nodes and IO nodes of the chiplet can include address range, type and/or hardware attributes, bandwidth, latency, interface type to the NOC, and the like.

According to examples provided herein, each host node 300 of each chiplet 110, 120, 130 can initiate a performance test of the chiplet 110, 120, 130, at block 315. As provided herein, the host node of the host chiplet 350 can also initiate a performance test on the host chiplet, and can further perform the functions of the host node(s) 300, in blocks 310, 315, 320, 325, and 330. The performance test performed on each chiplet can enable the host node 300 to verify the components of the chiplet using the CDA, at block 320, and further verify the connectivity of the chiplet using the CDA, at block 325. Thereafter, each host node 300 of each chiplet 110, 120, 130 can report the CDA 112, 122, 132 and provide a report of the condition of the chiplet to the host chiplet, at block 330.

In various implementations, the host node of the host chiplet 350 can receive the resource reports from the host nodes 300 of each chiplet 110, 120, 130, at block 365. As provided herein, the host node of the host chiplet 350 may also initiate its own performance test on its chiplet and verify the chiplet's components and connectivity using the chiplet's CDA. For example, the host node can verify the completeness, presence, exhaustiveness, operability, and connectivity of the chiplet's components. At block 370, the host node of the host chiplet 350 can confirm and/or validate the CDAs 112, 122, 132, components, and connectivity using the SDA 102 of the SIP 100. Once confirmed and/or validated, the host node of the host chiplet 350 can read the ADA of the application program 127 comprising a set of runnables, which can be executed sequentially on respective datasets (e.g., sensor data), at block 375. The host node of the host chiplet 350 can read the specification of each runnable in the ADA of the application program 127, at block 380, and verify the resources on-package for launching the respective runnable, at block 385 (e.g., verify the completeness, presence, exhaustiveness, and operability of the resources).

Upon reading the specification of each runnable, the host node of the host chiplet 350 can confirm that the SIP 100, or specified nodes of one or more chiplets of the SIP 100, includes the resources necessary for launching the runnable. If the resources (e.g., a number of DSPs) needed by the runnable is dependent on the input workload, the host node of the host chiplet 350 can confirm the availability of resources prior to every launch of the runnable. In certain examples, a scheduling DSP pair can oversee launch of runnables on a given set of resources required for launching the runnables as specified by the ADA. Once a runnable has been launched on the respective resources, the monitoring resources or a functional safety DSP pair of the host chiplet 350 can monitor that the resources completed execution within the duration allocated for the runnable (e.g., via the high-reliability network).

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A system-in-package (SIP) comprising:

a set of one or more chiplets, including a host chiplet;

wherein each chiplet of the one or more chiplets includes a respective set of resources and a respective host node;

wherein upon powerup sequencing of the system-in-package,

A) the host chiplet reads a system-in-package description artifact (SDA) that includes a top level identifier of the system-in-package; and B) each chiplet of the set (i) reads a chiplet description artifact (CDA) identifying the respective set of resources of the chiplet, and (ii) initiates a performance test to verify operability of the respective set of resources and connectivity between the respective set of resources as identified in the CDA.

2. The system-in-package of claim 1, wherein the set of chiplets includes the host chiplet and one or more other chiplets, and wherein the host node of each of the one or more other chiplets sends a respective report to the host chiplet that indicates results of the performance test and the CDA of the respective chiplet.

3. The system-in-package of claim 2, wherein the set of one or more other chiplets are a plurality of chiplets, wherein the SDA further specifies connectivity between the plurality of chiplets of the system-in-package, and wherein the host chiplet is adapted to use the SDA to (i) confirm each respective report received from respective host nodes of the plurality of chiplets, and (ii) verify completeness, presence, exhaustiveness, and connectivity between the plurality of chiplets of the system-in-package.

4. The system-in-package of claim 3, wherein the host chiplet is adapted to access program code of an application comprising a set of runnables, wherein the application is associated with an application description artifact (ADA) that includes a specification for each runnable of the application, the specification for each respective runnable indicating required resources for launching the respective runnable.

5. The system-in-package of claim 4, wherein the host chiplet is adapted to read the specification for each runnable in the ADA of the application and verify that the required resources are present among the plurality of chiplets of the SIP per the ADA.

6. The system-in-package of claim 5, wherein the runnable is subsequently launched on a chosen set of resources that satisfies the required resources for the runnable per the ADA.

7. The system-in-package of claim 1, wherein the set of resources of each chiplet of the set comprises at least one of: one or more input-output (IO) nodes, one or more types of memory, and one or more processing circuits.

8. The system-in-package of claim 1, wherein the host node of each of the one or more chiplets of the set includes a specified central processing unit or digital signal processing node of the chiplet that has a high safety integrity level, wherein the respective host node of each of the one or more chiplets of the set is included on a network-on-chip that also has the high safety integrity level, and wherein the respective host node of each of the one or more chiplets of the set communicates with other host nodes of the system-in-package using a high-reliability, functional-safety network.

9. The system-in-package of claim 1, wherein each respective chiplet of the one or more chiplets of the set is associated with a unique CDA, each unique CDA is a piece of information describing (i) all nodes of the respective chiplet, the nodes comprising at least one or more compute nodes, one or more memory nodes, and one or more input-output nodes of the respective chiplet, and (ii) connectivity between the nodes.

10. The system-in-package of claim 1, wherein the SDA is a piece of information comprising a hierarchically organized, read-only object configured for discovery and verification of various attributes of the system-in-package, the various attributes including the one or more chiplets of the system-in-package.

11. A method of discovering and validating resources on a system-in-package, the system-in-package having a plurality of chiplets, including a host chiplet and one or more other chiplets, the method being performed by the plurality of chiplets of the system-in-package and comprising:
- upon powerup sequencing of the system-in-package:
  - reading, by a host node of the host chiplet, a system-in-package description artifact (SDA) that includes a top level identifier of the system-in-package;
  - reading, by a host node of each of the one or more other chiplets, a chiplet description artifact (CDA) identifying a set of resources of the chiplet;
  - initiating, by each chiplet of the plurality of chiplets of the system-on-chip, a performance test to verify operability of the set of resources and connectivity between the set of resources as identified in the CDA of the chiplet.

12. The method of claim 11, wherein the host node of each of the one or more other chiplets sends a respective report to the host node of the host chiplet that indicates results of the performance test performed on the respective chiplet and the CDA of the respective chiplet.

13. The method of claim 12, wherein the SDA further specifies connectivity between the plurality of chiplets of the system-in-package, and wherein the host node of the host chiplet uses the SDA to (i) confirm each respective report received from the plurality of chiplets, and (ii) verify completeness, presence, exhaustiveness, and the connectivity between the plurality of chiplets of the system-in-package.

14. The method of claim 13, wherein the host chiplet is adapted to access program code of an application comprising a set of runnables, wherein the application is associated with an application description artifact (ADA) that includes a specification for each runnable of the application, the specification for each respective runnable indicating required resources for launching the respective runnable.

15. The method of claim 14, wherein the host chiplet is adapted to read the specification for each runnable in the ADA of the application and verify that the required resources for launching the runnable are present among the plurality of chiplets of the system-in-package.

16. The method of claim 15, wherein the host chiplet launches the runnable on a chosen set of resources that satisfies the required resources for launching the runnable.

17. A method of discovering and validating resources on a system-in-package, the system-in-package having a plurality of chiplets, including a host chiplet and one or more other chiplets, the method being performed by the plurality of chiplets of the system-in-package and comprising:
- upon powerup sequencing of the system-in-package, reading, by a host node of the host chiplet, a system-in-package description artifact (SDA) comprising a top level identifier of the system-in-package and a set of unique chiplet description artifacts (CDAs) corresponding to the plurality of chiplets of the system-in-package, each unique CDA of each respective chiplet identifying a set of resources of the respective chiplet;
- wherein a respective host node of each respective chiplet of the plurality of chiplets (i) reads, upon powerup sequencing of the system-in-package, its unique CDA of the respective chiplet, (ii) initiates a performance test to verify operability of the set of resources and connectivity between the set of resources of the respective chiplet as identified in the unique CDA of the respective chiplet, and (iii) sends a respective report to the host node of the host chiplet that indicates results of the performance test.

18. The method of claim 17, further comprising:
- upon processing each respective report and validating the plurality of chiplets, accessing program code comprising a set of runnables, each runnable including a specification indicating required resources for launching the runnable;
- reading the specification for each runnable in the program code;
- verifying that the required resources for launching the runnable are present among the plurality of chiplets of the system-in-package; and launching the runnable on a chosen set of resources that satisfies the required resources for the runnable.

* * * * *